United States Patent
Kang et al.

(10) Patent No.: US 8,192,891 B2
(45) Date of Patent: Jun. 5, 2012

(54) MONOPOLAR TYPE MEMBRANE ELECTRODE ASSEMBLY HAVING SENSING ELEMENT

(75) Inventors: Sang-kyun Kang, Yongin-si (KR); Jae-yong Lee, Yongin-si (KR); Chan-ho Pak, Yongin-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 494 days.

(21) Appl. No.: 11/869,065

(22) Filed: Oct. 9, 2007

(65) Prior Publication Data

US 2009/0068522 A1    Mar. 12, 2009

(30) Foreign Application Priority Data

Nov. 22, 2006  (KR) .................. 10-2006-0116060

(51) Int. Cl.
*H01M 8/10*  (2006.01)
(52) U.S. Cl. .................. 429/479; 429/483
(58) Field of Classification Search .................. 429/30, 429/479
See application file for complete search history.

(56) References Cited

U.S. PATENT DOCUMENTS

| | | | | |
|---|---|---|---|---|
| 5,945,232 A | * | 8/1999 | Ernst et al. | 429/413 |
| 6,214,487 B1 | * | 4/2001 | Kelley et al. | 429/430 |
| 6,339,313 B1 | * | 1/2002 | Adams et al. | 320/121 |
| 7,776,485 B1 | * | 8/2010 | Davis et al. | 429/458 |
| 2003/0091878 A1 | * | 5/2003 | Rosenfeld et al. | 429/19 |
| 2006/0105220 A1 | * | 5/2006 | Shu et al. | 429/34 |
| 2007/0248889 A1 | * | 10/2007 | Schmidt et al. | 429/309 |

FOREIGN PATENT DOCUMENTS

| | | |
|---|---|---|
| JP | 2004-103262 | 4/2004 |
| KR | 10-2000-0025190 A | 5/2000 |
| KR | 10-2004-0092636 A | 11/2004 |

* cited by examiner

*Primary Examiner* — Patrick Ryan
*Assistant Examiner* — Brent Thomas
(74) *Attorney, Agent, or Firm* — Lee & Morse, P.C.

(57) ABSTRACT

A monopolar membrane electrode assembly (MEA) for a fuel cell, for example, includes: an electrolyte membrane; anode and cathode electrodes formed on opposite surfaces of the electrolyte membrane, respectively; current collecting bodies that form electrical paths of electricity generated from an electricity generation reaction between the anode and cathode electrodes and the electrolyte membrane; and sensing elements to measure changes in operation state conditions during electricity generation and electrical connection. Since temperature and fuel concentration in the monopolar MEA having the above structure are detected on a real time basis, appropriate action can be taken whenever an abnormal operation thereof is detected.

16 Claims, 13 Drawing Sheets

MONOPOLAR TYPE MEMBRANE ELECTRODE ASSEMBLY HAVING SENSING ELEMENT

CROSS-REFERENCE TO RELATED APPLICATION

This application claims the benefit of Korean Application No. 2006-116060, filed Nov. 22, 2006 in the Korean Intellectual Property Office, the disclosure of which is incorporated herein by reference.

BACKGROUND OF THE INVENTION

1. Field of the Invention

Aspects of the present invention relate to a membrane electrode assembly (MEA), and more particularly, to a monopolar type MEA having sensing elements that can continuously measure internal state conditions such as temperature or fuel concentration in the MEA.

2. Description of the Related Art

A fuel cell is an electricity generator that converts chemical energy of a fuel into electrical energy through a chemical reaction. The fuel cell can continuously generate electricity as long as the fuel is supplied. Accordingly, when air that includes oxygen is supplied to a cathode electrode and a fuel containing hydrogen is supplied to an anode electrode, electricity is generated by an inverse reaction of water electrolysis through an electrolyte membrane interposed between the cathode and anode electrodes of the fuel cell. A structure in which the cathode electrode, the anode electrode, and the electrolyte membrane are assembled is called a membrane electrode assembly (MEA).

There are various types of fuel cells. Direct methanol fuel cells (DMFCs), which have recently been highlighted, use methanol as the fuel, and has several advantages. Some of the advantages of the DMFC include having high energy density and high current density, not requiring peripheral facilities such as a fuel processor since the methanol is directly fed to the fuel cells, and having ease of storage and supply of the fuel.

Among the DMFCs, a monopolar type DMFC has a structure in which a plurality of unit cells are connected in series, and are arranged on one electrolyte membrane. Thus, the thickness and volume of the monopolar type DMFC can be greatly reduced, and a slim and small DMFC can be manufactured accordingly.

However, monopolar type MEAs that have been used or proposed have a structure that can actively sustain an electricity generation reaction but do not have an element that can directly measure internal state conditions of the fuel cell, such as a temperature change or a fuel concentration change. Accordingly, determination of an optimum condition of a fuel supply or a temperature setting is difficult, and detection of an abnormal operation state of the fuel cell is delayed that may result in damage to the fuel cell.

Accordingly, there is a need to develop a new type of an MEA that is able to detect changes of internal state conditions in the MEA.

SUMMARY OF THE INVENTION

Aspects of the present invention relate to a monopolar type membrane electrode assembly (MEA) that can continuously detect changes of internal state conditions, such as temperature or fuel concentration, of the MEA.

According to an aspect of the present invention, a monopolar membrane electrode assembly (MEA) includes: an electrolyte membrane having a plurality of cell regions; an anode supporting body and a cathode supporting body respectively formed on opposite surfaces of the electrolyte membrane, and each having a plurality of first openings corresponding to each of the cell regions and a plurality of second openings connected to the each of the cell regions; a plurality of anode current collecting bodies and a plurality of cathode current collecting bodies that are respectively installed in each of the cell regions on the anode and cathode supporting bodies, and comprising current collecting units to collect current from the cell regions and conduction units formed on a side of the current collecting units; and a plurality of anode electrodes and cathode electrodes respectively installed on the anode current collecting bodies and the cathode current collecting bodies, wherein ends of the conduction units of the cathode current collecting bodies are electrically connected in series to ends of the conduction units of the anode current collecting bodies that are adjacent through the second openings, and, and one or more sensing elements that detect changes in operation state conditions in the monopolar MEA during electricity generation and electrical connection are mounted in the anode and cathode current collecting bodies, respectively.

According to another aspect of the present invention, a monopolar MEA includes: an electrolyte membrane having a plurality of cell regions; an anode supporting body and a cathode supporting body respectively formed on opposite surfaces of the electrolyte membrane, and respectively having a plurality of openings corresponding to the each of the cell regions; a plurality of anode current collecting bodies and a plurality of cathode current collecting bodies that are respectively installed in each of the cell regions on the anode and cathode supporting bodies, and respectively comprising current collecting units to collect current from the cell regions and conduction units on a side of the current collecting units; and a plurality of anode electrodes and cathode electrodes respectively installed on the anode current collecting bodies and the cathode current collecting bodies, wherein ends of the conduction units of the cathode current collecting bodies and ends of the conduction units of the anode current collecting bodies are respectively exposed to outside of the anode and cathode supporting bodies, and the ends of the conduction units of the cathode current collecting bodies and the end of the conduction units of the anode current collecting bodies are electrically connected in series outside of the anode and the cathode supporting bodies, and one or more sensing elements that detect changes in operation state conditions in the monopolar MEA during electricity generation and electrical connection are mounted in the anode and cathode current collecting bodies, respectively.

According to aspects of the present invention, the one or more sensing elements may comprise resistance devices that contact the electrolyte membrane to measure temperature changes in the monopolar MEA due to a resistance variation in the sensing elements, or the one or more sensing elements may comprise at least a pair of the sensing elements that contact the electrolyte membrane to measure the fuel concentration changes of a fuel wetted on the electrolyte membrane from a resistance difference or a change in the resistance between the pair of the sensing elements.

According to aspects of the present invention, the sensing elements may comprise devices to measure a generation voltage of the anode and cathode electrodes in each of the unit cell regions and devices to measure an open circuit voltage (OCV).

According to aspects of the present invention, the conduction units of the anode and cathode current collecting bodies may comprise on/off switches so that the current collecting bodies are selectively connected.

According to aspects of the present invention, the anode and cathode supporting bodies may be formed of polyimide, polyethylene, polypropylene, and/or polyvinyl chloride. Each of the anode and cathode supporting bodies and the anode and cathode current collecting bodies may be respectively formed in a single unit as a flexible printed circuit board (FPCB).

According to aspects of the present invention, the anode and cathode current collecting bodies may be formed of Ag, Au, Al, Ni, Cu, Pt, Ti, Mn, Zn, Fe, Sn, and/or alloys of these metals.

According to another aspect of the present invention, a monopolar membrane electrode assembly (MEA), includes an electrolyte membrane having a first surface and a second surface; an anode support disposed at the first surface, and having a plurality of anode current collectors; a cathode support disposed at the second surface, and having a plurality of cathode current collectors; one or more sensing elements respectively attached to each of the plurality of the anode and cathode current collectors to detect changes in operation state conditions in the monopolar MEA during electricity generation and electrical connection; and connections to connect the anode current collectors to the cathode current collectors in series.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the present invention will become apparent and more readily appreciated from the following description of the aspects, taken in conjunction with the accompanying drawings of which.

DETAILED DESCRIPTION OF THE EMBODIMENTS

Figure 1:
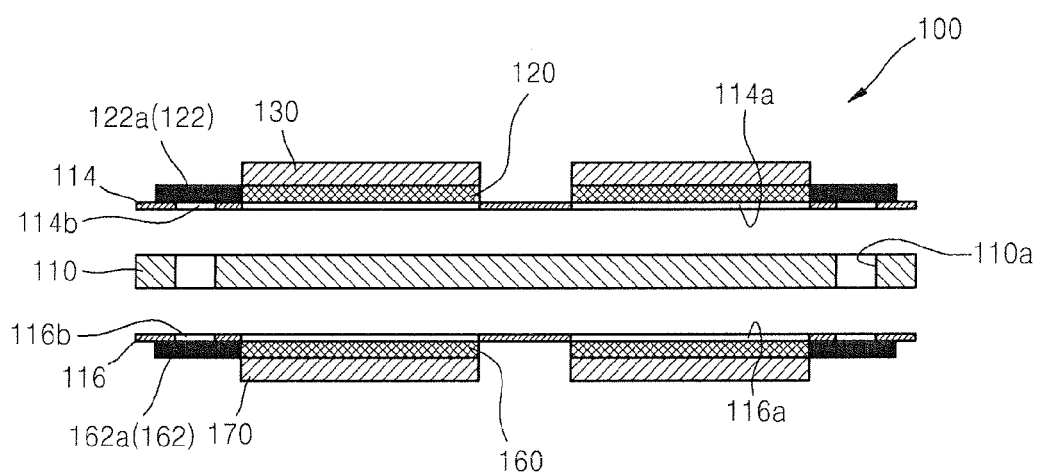
FIG. 1 is a schematic cross-sectional view illustrating a monopolar type membrane electrode assembly (MEA) according to an aspect of the present invention.

Reference will now be made in detail to the aspects of the present invention, examples of which are illustrated in the accompanying drawings, wherein like reference numerals refer to the like elements throughout. The aspects are described below in order to explain the present invention by referring to the figures.

Figure 2:
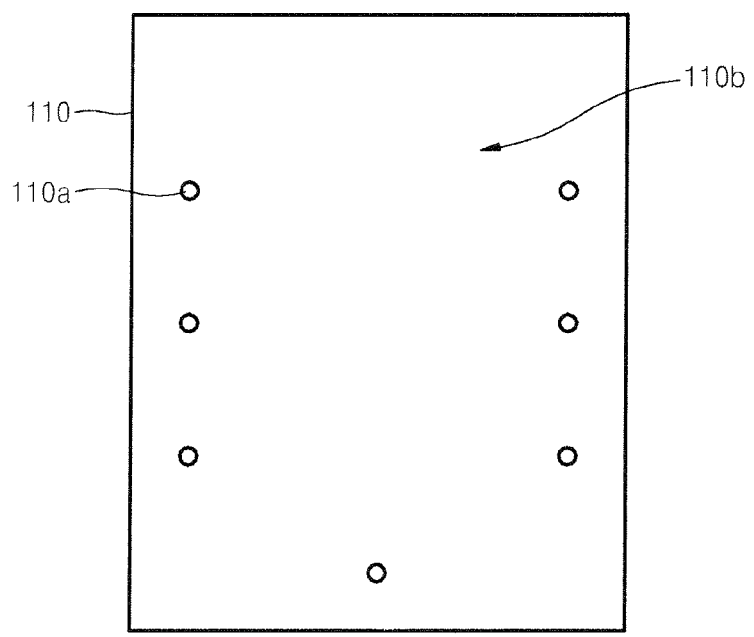
FIG. 2 is a plan view illustrating an electrolyte membrane of the monopolar type MEA of FIG. 1, according to an aspect of the present invention.
Figure 3:
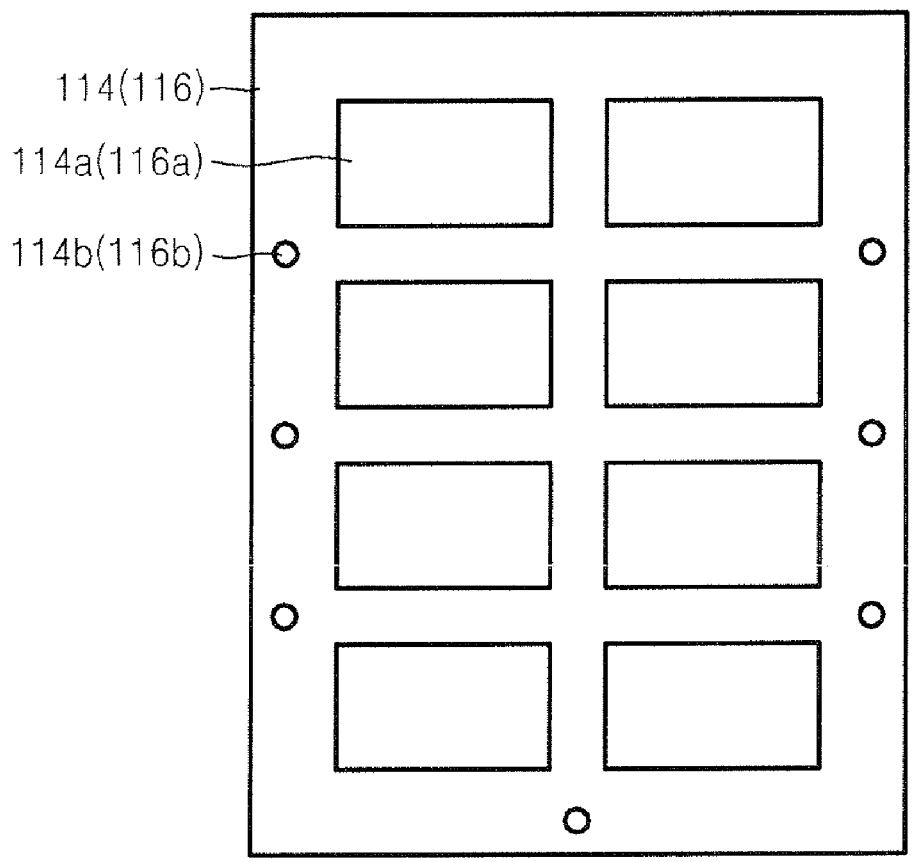
FIG. 3 is a plan view illustrating a supporting body of the monopolar type MEA of FIG. 1, according to an aspect of the present invention.
Figure 4:
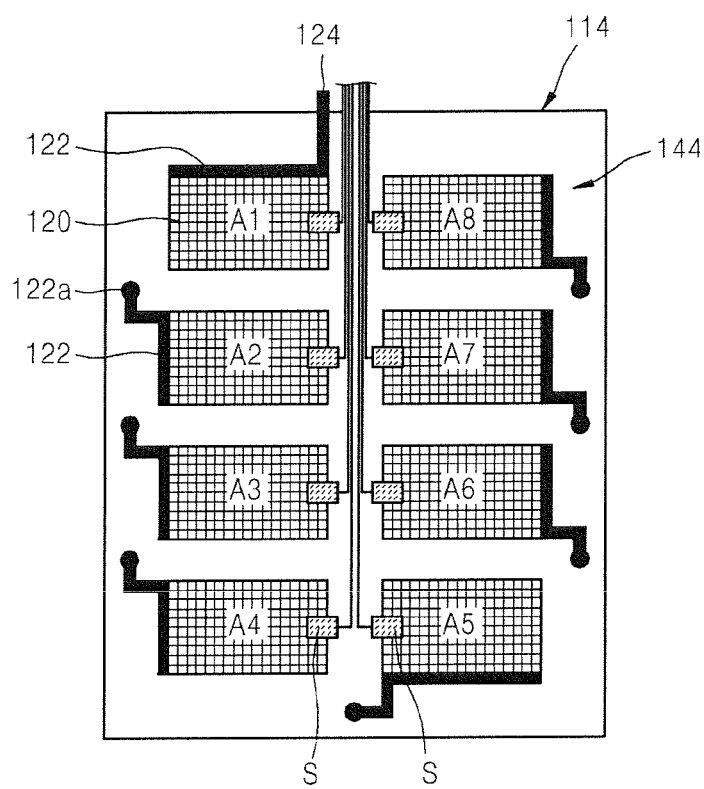
FIGS. 4 and 5 are plan views respectively illustrating anode and cathode current collecting bodies that can be inserted into the monopolar type MEA of FIG. 1, according to an aspect of the present invention.
Figure 5:
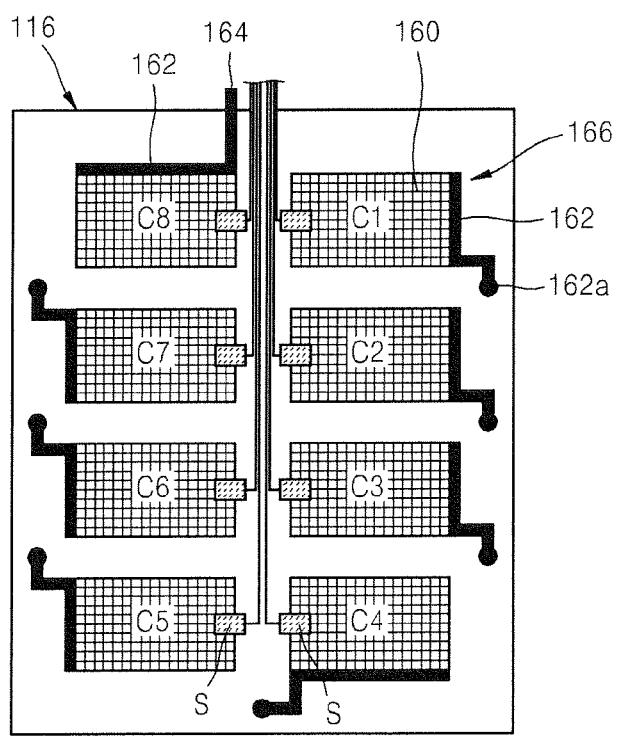

FIG. 1 is a schematic cross-sectional view illustrating a monopolar type membrane electrode assembly (MEA) 100 that includes an electrolyte membrane 110 according to an aspect of the present invention. FIG. 2 is a plan view illustrating the electrolyte membrane 110 of the monopolar type MEA 100 of FIG. 1, according to an aspect of the present invention. FIG. 3 is a plan view illustrating a supporting body of the monopolar type MEA 100 of FIG. 1, according to an aspect of the present invention. FIGS. 4 and 5 are plan views respectively illustrating anode and cathode current collecting bodies 144, 166 that can be inserted into the monopolar type MEA 100 of FIG. 1, according to an aspect of the present invention.

Referring to FIGS. 1 through 5, the monopolar type MEA 100 (into which the anode and cathode current collecting bodies are inserted) includes the electrolyte membrane 110 on which a plurality of cell regions 110b. For example, eight cells (first through eighth cells) are formed on the regions 110b in the shown example. Non-conductive supporting bodies 114 and 116 are formed on both surfaces of the electrolyte membrane 110, respectively. The non-conductive supporting bodies 114 and 116 respectively have a plurality of first openings 114a and 116a (FIG. 3) that corresponds to each of the cell regions 110b of the electrolyte membrane 110. In various aspects, the non-conductive supporting bodies 114 and 116 can also be formed of polyimide films, or films or layers of polyethylene, polypropylene, polyvinyl chloride, or other materials.

As shown, each of the non-conductive supporting bodies 114 and 116 further include second openings 114b and 116b, respectively, related to the second to seventh cell regions (FIGS. 4 and 5) and the first (FIG. 5) or eighth (FIG. 4) cell region. The electrolyte membrane 110 can further include openings 110a corresponding to the second openings 114b and 116b of the respective non-conductive supporting bodies 114 and 116 as shown, but need not in all aspects.

First through eighth anode current collecting units 120 (A1 through A8) and first through eighth cathode current collecting units 160 (C1 through C8) are formed in the respective cell regions in the respective non-conductive supporting bodies 114 and 116. Anode electrodes 130 and cathode electrodes 170 are respectively installed on the first through eighth anode current collecting units 120 and the first through eighth cathode current collecting units 160.

Each of the anode and cathode electrodes 130 and 170 includes of a catalyst layer, a fuel diffusion layer, and an electrode supporting body. As shown in FIGS. 4 and 5, the first through eighth anode current collecting units 120 (A1-A8) and the first through eighth cathode current collecting units 160 (C1-C8) can be metal meshes having a lattice shape. A conduction unit 122 is formed on a side of each of the anode current collecting units 120 (A1-A8), and a conduction unit 162 is formed on a side of each of the cathode current collecting units 160 (C1-C8). Each of the anode and cathode current collecting bodies 144 and 166 include the first through eighth anode and cathode current collecting units 120 (A1-A8) and 160 (C1-C8), and the conduction units 122 and 162 that are connected to the corresponding anode and cathode current collecting units 120 (A1-A8) and 160 (C1-C8), respectively.

FIGS. 4 and 5 also respectively illustrate anode and cathode current collecting bodies 144 and 166. In various aspects, flexible printed circuit boards (FPCBs) have the current collecting bodies 144 and 166 (formed of a conductive metal) that are formed on the non-conductive supporting bodies 114 and 116, such as polyimide films. In this case, after the anode current collecting bodies 144 and the cathode current collecting bodies 166 are respectively formed on polyimide films in one unit (or as a single unit) with the polyimide films, the polyimide films can be bonded to the electrolyte membrane 110 to form the MEA 100.

The conduction unit 122 connected to the first anode current collecting unit 120 (A1) and the conduction unit 162 connected to the eighth cathode current collecting unit 160 (C8) are respectively connected to terminals 124 and 164 to be electrically connected to an external device (not shown). The terminals 124 and 164 may be formed as extensions of the conduction unit 122 connected to the first anode current collecting unit 120 (A1) and the conduction unit 162 connected to the eighth cathode current collecting unit 160 (C8), respectively.

As shown in FIG. 5, an end 162a of the conduction unit 162 of the first cathode current collecting unit 160 (C1) in the first cell is located on the second opening 116b formed in the non-conductive supporting body 116. Also, as shown in FIG. 4, an end 122a of the conduction unit 122 of the second anode current collecting unit 120 (A2) in the second cell is located on the second opening 114b formed in the non-conductive supporting body 114. The respective ends 122a and 162a of the conduction units 122 and 162 are electrically connected through the second openings 114b and 116b and the openings 110a. To form a structure, such as the flexible printed circuit boards (FPCBs), the non-conductive supporting body 116 (on which the first through eighth cathode current collecting units 160 (C1-C8), the conduction units 162, and the terminal 164 are formed) is disposed between the cathode electrodes 170 and the electrolyte membrane 110. Also, the non-conductive supporting body 114 (on which the first through eighth anode current collecting units 120 (A1-A8), the conduction units 122, and the terminal 124 are formed) is disposed between the anode electrodes 130 and the electrolyte membrane 110.

Then, the non-conductive supporting body 116, the non-conductive supporting body 114, and the electrolyte membrane 110, are hot pressed at a temperature of 125° C. for 3 minutes with a compression of 3 tons per $cm^2$ while the openings 114b and 116b formed in the non-conductive supporting bodies 114 and 116, respectively, are aligned. In other aspects, other temperatures, times, and/or pressures are possible.

Afterwards, the respective ends 122a and 162a of the conduction units 122 and 162 are bonded (or welded) through the second openings 114b and 116b, and the openings 110a, using a spot welder or an ultrasonic welder, for example. In this way, the second through eighth anode current collecting units 120 (A2 through A8) in each of the cells are electrically connected to the respective first through seventh cathode current collecting units 160 (C1 through C7), in the adjacent cell, through the openings 114b and 116b and the openings 110a. Accordingly, the first through eighth cells of the anode and cathode current collecting bodies 144 and 166 are connected in series.

In the aspect shown, the first through eighth anode and cathode current collecting units 120 (A1-A8) and 160 (C1-C8), the conduction units 122 and 162, and the terminals 124 and 164 can be formed of a metal having electrical conductivity of 1 S/cm (siemens per centimeter) or more. The metal may be or include Ag, Au, Al, Ni, Cu, Pt, Ti, Mn, Zn, Fe, Sn, or an alloy of these metals. Instead of a metal, a conductive polymer, such as polyaniline, polypyrrole, polythiophene, or other materials, can also be used.

In other aspects, the electrolyte membrane 110 does not have the openings 110a. In this aspect, the size of the electrolyte membrane 110 is smaller than the non-conductive supporting bodies 114, 116, for example, so that edges of the electrolyte membrane 110 are located to the inside of the locations of the second openings 114b and 116b of the non-conductive supporting bodies 114, 116.

A fuel cell can be manufactured when a hydrogen supply unit (not shown) and an oxygen (or air) supply unit (not shown) are respectively formed on side surfaces of the monopolar type MEA 100. The method of manufacturing such a fuel cell is well known in the art. Thus, a detailed description thereof will be omitted.

In the monopolar type MEA 100, the conduction units 122 and 162 that electrically connect the anode electrodes 130 to the cathode electrodes 170 have a very short length since the conduction units 122 and 162 are directly connected. Accordingly, the connection has a small electrical resistance. Also, since the first through eighth anode and cathode current collecting units 120 (A1-A8) and 160 (C1-C8), respectively, are installed between the electrolyte membrane 110 (which is a reaction interface) and the catalyst layers (not shown) of the anode and cathode electrodes 130 and 170, electrons generated from the catalyst layers are collected in the current collecting units 120, 160 that directly contact the catalyst layers. Therefore, there is little or reduced resistance when the electrons pass through the fuel diffusion units (not shown) of the anode and cathode electrodes 130 and 170 and the electrode supporting bodies 114 and 116 compared to those of the related art.

As depicted in FIGS. 4 and 5, sensing elements S are installed in each of the anode and cathode current collecting bodies 144 and 166. As shown, each sensor S corresponds to one of the collecting units A1 through A8 or C1 through C8, and is electronically connected to an external device, such as a controller, via a wire as shown. The wires connecting the sensors S to the external device are disposed on the non-conductive supporting bodies 114, 116 between adjacent pairs of units A1-A8 or C1 through C8. The sensing elements S are a kind of a resistance device installed in the anode and cathode current collecting bodies 144 and 166. The sensing elements S can be thermistors. An end of each of the sensing elements S contacts the electrolyte membrane 110 to measure the resistance of the electrolyte membrane 110 while another end of the resistance device S is installed in (or attached to) the anode and cathode current collecting bodies 144 and 166. As described above, an internal resistance of the resistance devices (such as the thermistor) very sensitively varies according to a temperature change. Therefore, the temperature change in a unit cell can be detected from the measurement of the variation of resistance in the sensing elements S.

Accordingly, the temperature change in the unit cell is measured from the internal resistance variation of the sensing elements S. When an abnormal operation is detected, appropriate action can be immediately taken. Thus, a smooth operation of the fuel cell can be maintained.

Figure 6:
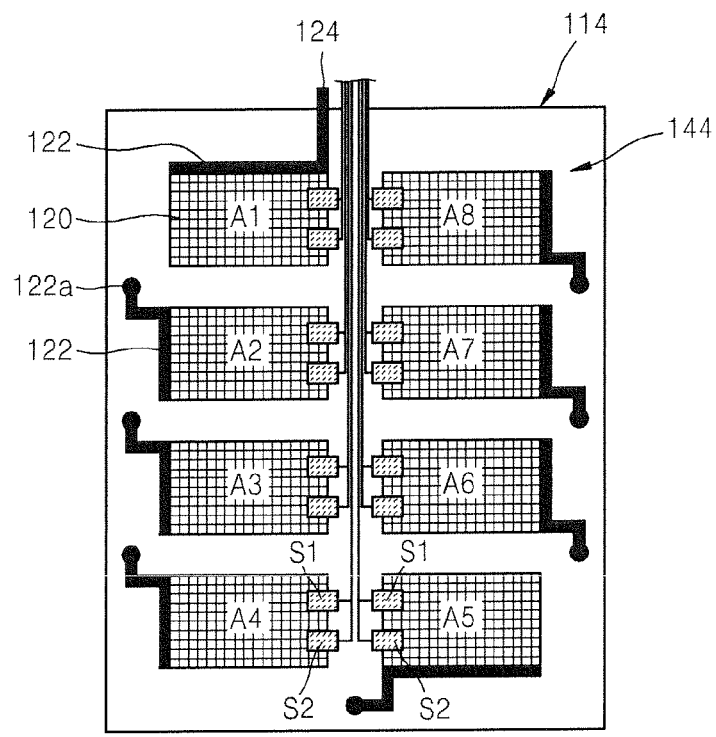
FIGS. 6 through 9 illustrate modifications of sensing elements in the current collecting bodies of the monopolar type MEA of FIG. 1, according to aspects of the present invention.
Figure 7:
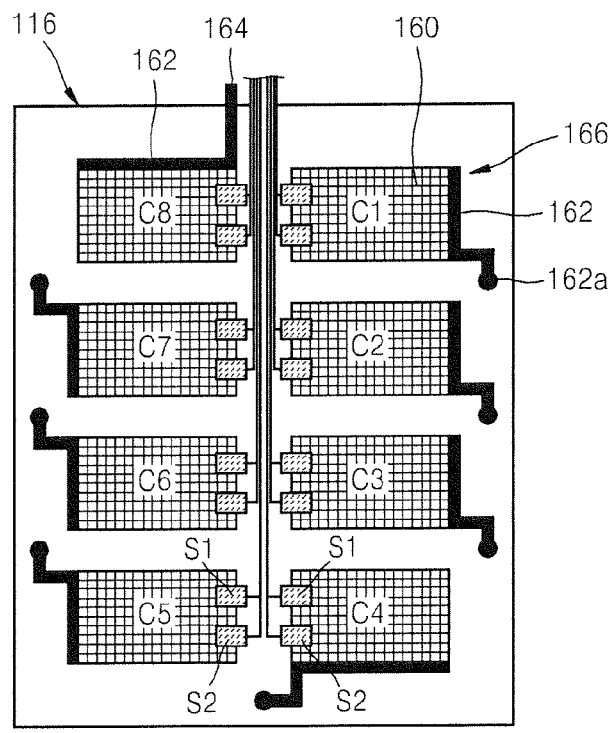

FIGS. 6 through 9 illustrate modifications of the sensing elements S in the current collecting bodies 144 and 166 of the monopolar type MEA 100, according to aspects of the present invention. The sensing elements S can include a pair of resistance devices S1 and S2 as depicted in FIGS. 6 and 7. That is, each of the pair of electrodes (sensing elements or resistance devices) S1 and S2 contacts the electrolyte membrane 110. This paired structure is used to measure a fuel concentration change of the fuel supplied to the MEA 100 by using the variation of resistance between the electrodes S1 and S2. That is, resistance that is measured by the pair of electrodes S1 and S2 varies according to the concentration of the fuel that wets the electrolyte membrane 110. Therefore, the change of concentration of the fuel supplied to the MEA 100 can be measured from the variation of the resistance difference between the resistances measured by the pair of resistance devices S1 and S2. Accordingly, appropriate action against changes in the concentration of fuel in the fuel cell can be taken. The structure described above allows for the operation state or conditions of the fuel cell to be detected on a real time basis.

Figure 8:
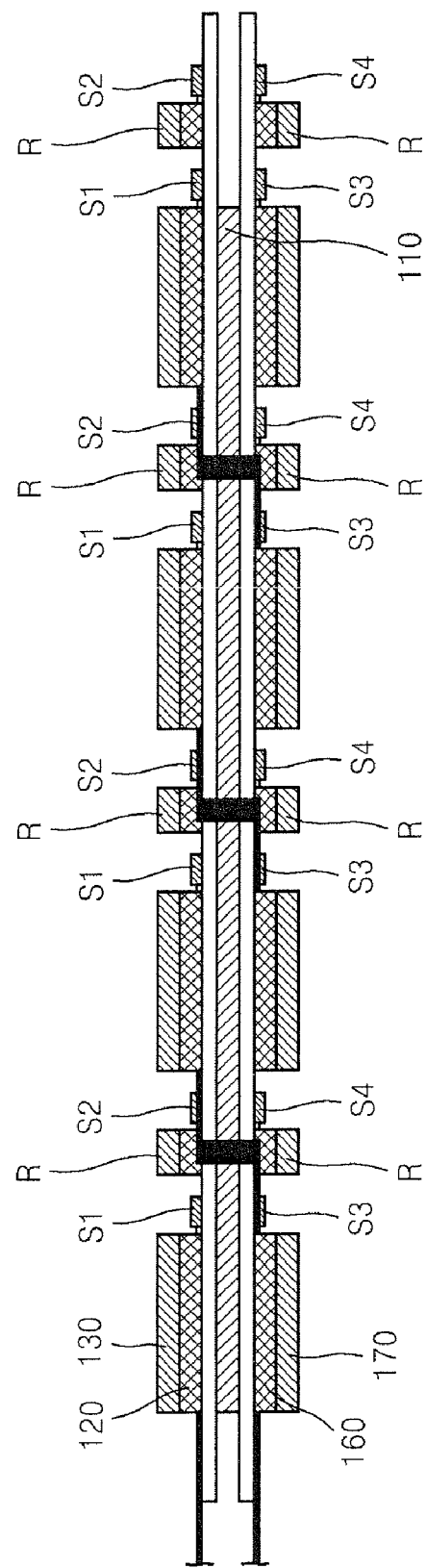

FIG. 8 illustrates a structure of the sensing elements S installed in the anode and cathode current collecting bodies 144 and 166 as modified. An aspect of the structure is that resistance devices S1 through S4 to measure generated voltages and an open circuit voltage (OCV), of the anode and cathode electrodes 130 and 170, are installed in the anode and cathode current collecting bodies 144 and 166. A generated voltage is voltage of electricity generated with a normal load, and the open circuit voltage (OCV) is a voltage of electricity generated without a load. The structure is useful for determining the supply state conditions of the fuel by measuring the variation of the generated voltage with respect to the OCV. That is, the structure includes sensing elements S1 and S3 to measure the generated voltage of the anode and cathode electrodes 130 and 170, and sensing elements S2 and S4 to measure the OCV to detect the variation of the generated voltage with respect to the OCV.

For example, if there is a large voltage difference between the generated voltage and the OCV in the anode electrode 130, such denotes that supply of fuel is insufficient. Meanwhile, if there is a large voltage difference between the generated voltage and the OCV in the cathode electrode 170, such denotes that supply of oxygen is insufficient. Accordingly, from the measurement results of generated voltages and/or changes thereof, the supply state of the fuel and oxygen can be directly determined, and appropriate action can be taken accordingly. The structure illustrated in FIG. 8 includes reference electrodes R that is separated from each of the anode and cathode electrodes 130 and 170 in order to measure the OCV. The sensing elements S2 and S4 for measuring the OCV are connected to the reference electrodes R.

Figure 9:
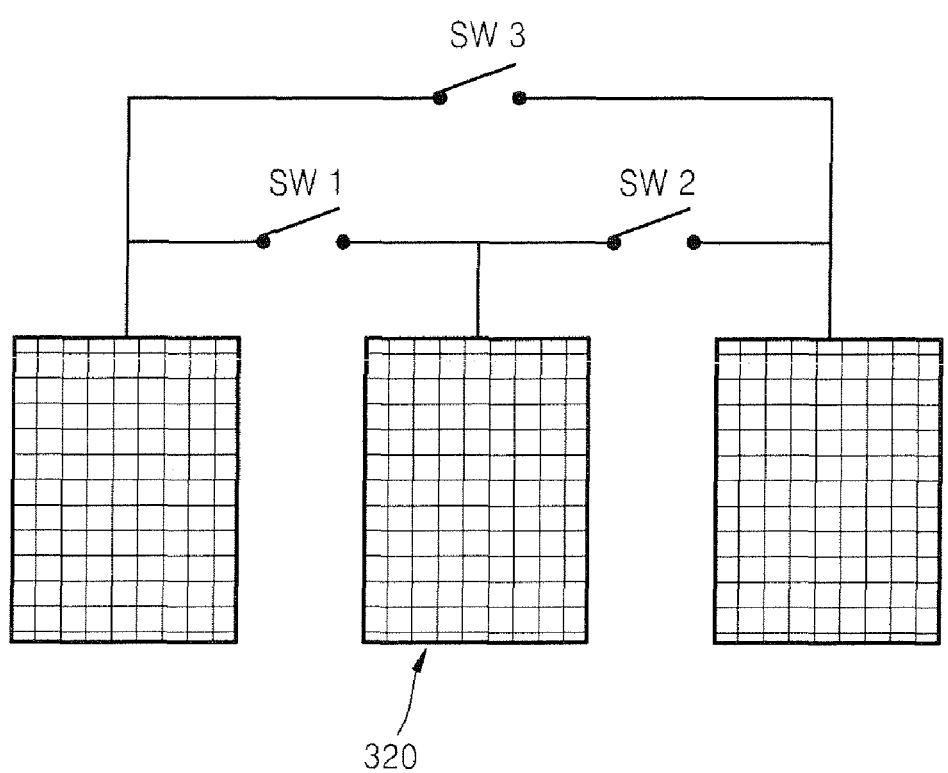

To detect the operation state of the fuel cell on a real time basis by installing the sensing elements S within the MEA as described above, a control structure as depicted in FIG. 9 can be used. In FIG. 9, for sake of convenience, each of the unit cells (320) is simply depicted as a block. On/off switches sw1 and sw2 are installed on a conductive connection unit (simply depicted as a connecting line) that electrically connects the unit cell blocks. As shown, a bypass line that bypasses the unit cell block (320) is located in the middle of the structure, and an on/off switch sw3 is installed on the bypass line. In this configuration, during a normal state, as detected by the sensors S, the on/off switches sw1 and sw2 between the unit cell blocks are switched on. However, if there is a problem in the middle unit cell block due to sudden change in temperature, fuel concentration, voltage, or other changes, as detected by the sensors S, the two on/off switches sw1 and sw2 are switched off. Instead, the on/off switch sw3 in the bypass line is switched on to bypass the middle unit cell block. Therefore, if there is any problem, appropriate action can be immediately taken. When a controller is employed, the on/off switches sw1, sw2, and sw3 can be operated automatically, based on input received by the sensors S.

Figure 10:
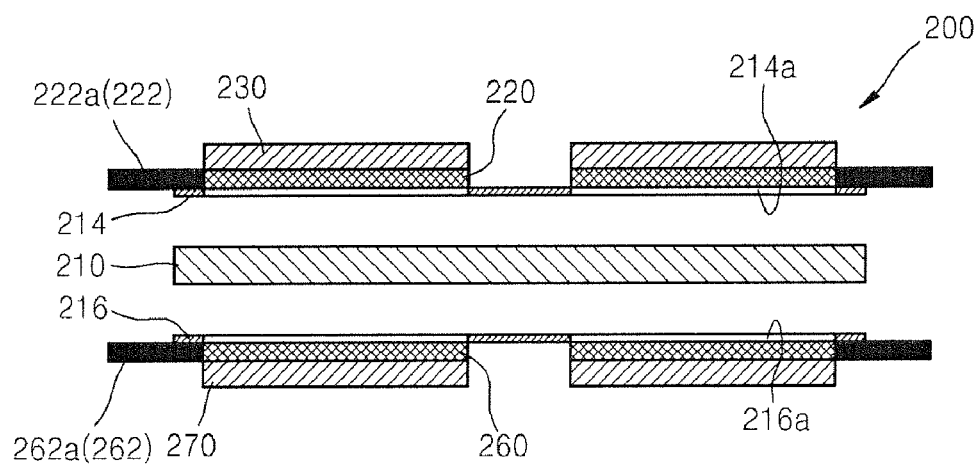
FIG. 10 is a schematic cross-sectional view illustrating a monopolar type MEA according to another aspect of the present invention.
Figure 11:
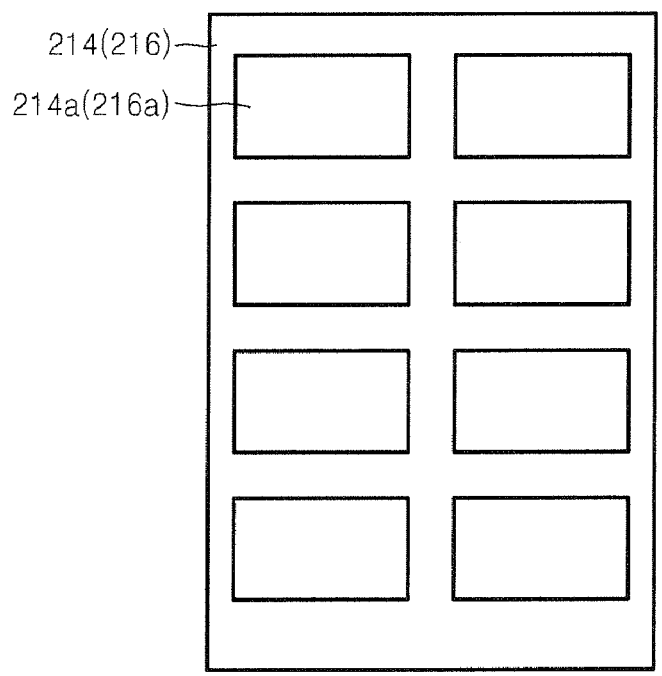
FIG. 11 is a plan view illustrating a supporting body of the monopolar type MEA of FIG. 10, according to another aspect of the present invention.
Figure 12:
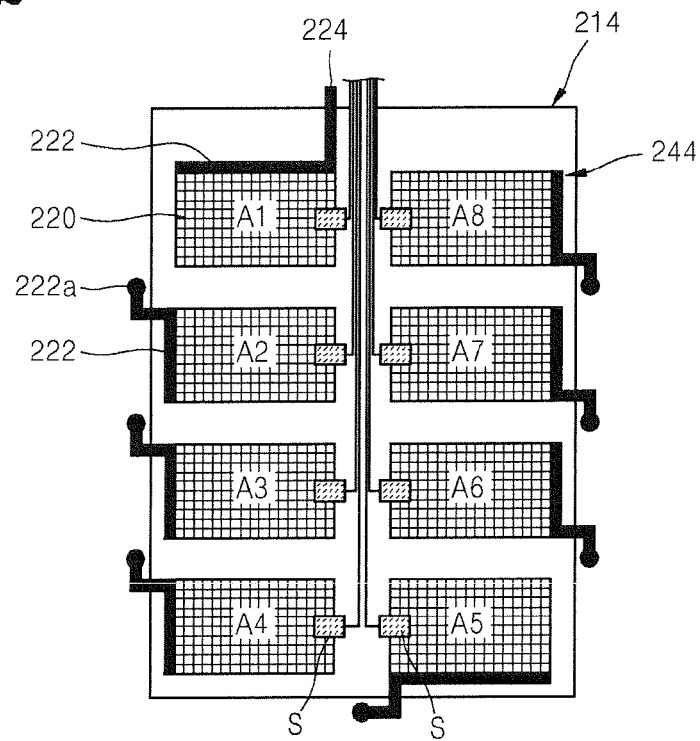
FIGS. 12 and 13 are plan views respectively illustrating anode and cathode current collecting bodies that can be inserted into the monopolar type MEA of FIG. 10, according to another aspect of the present invention.
Figure 13:
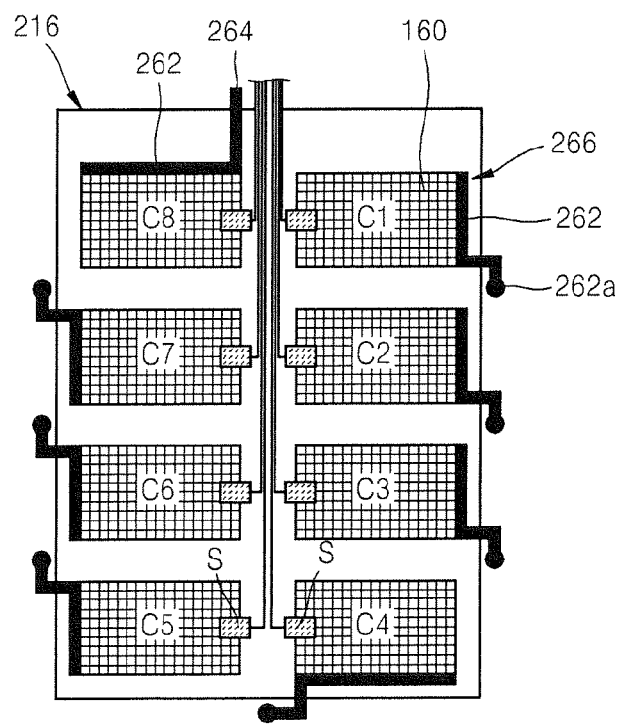

FIG. 10 is a schematic cross-sectional view illustrating a monopolar type MEA 200 according to another aspect of the present invention. FIG. 11 is a plan view illustrating a supporting body of the monopolar type MEA 200 of FIG. 10, according to an aspect of the present invention. FIGS. 12 and 13 are plan views respectively illustrating anode and cathode current collecting bodies that can be inserted into the monopolar type MEA 200 of FIG. 10, according to an aspect of the present invention.

Referring to FIGS. 10 through 13, the monopolar type MEA 200 (into which the anode and cathode current collecting bodies 244, 266 of FIGS. 12 and 13 are inserted) includes an electrolyte membrane 210 on which a plurality of cell regions 210*b*, for example, for eight cells (first through eighth cells) are formed. Non-conductive supporting bodies 214 and 216 are formed on both surfaces of the electrolyte membrane 210, respectively. The non-conductive supporting bodies 214 and 216 may be, for example, polyimide films, and respectively have a plurality of openings 214*a* and 216*a* that correspond to each of the cell regions. In various aspects, the non-conductive supporting bodies 214 and 216 can also be films or layers formed of polyethylene, polypropylene, polyvinyl chloride, or other materials.

First through eighth anode current collecting units 220 (A1 through A8) and first through eighth cathode current collecting units 260 (C1 through C8) are formed in the respective cell regions in the non-conductive supporting bodies 214 and 216, respectively. Anode electrodes 230 and cathode electrodes 270 are respectively installed on the first through eighth anode current collecting units 220 and the first through eighth cathode current collecting units 260.

Each of the anode and cathode electrodes 230 and 270 includes a catalyst layer, a fuel diffusion layer, and an electrode supporting body, as shown in FIGS. 12 and 13. The first through eighth anode current collecting units 220 (A1-A8) and the first through eighth cathode current collecting units 260 (C1-C8) can be metal meshes having a lattice shape, but can be other types of collectors. A conduction unit 222 is formed on a side of each of the first through eighth anode current collecting units 220 (A1-A8), and an end 222*a* of the conduction unit 222 extends to be exposed to the outside of the non-conductive supporting body 214. A conduction unit 262 is formed on a side of each of the first through eighth cathode current collecting units 260 (C1-C8), and an end 262a of each of the conduction units 262 extends to be exposed to the outside of the non-conductive supporting body 216. Each of the anode and cathode collecting bodies 244 and 266 include the first through eighth anode and cathode current collecting units 220 (A1-A8) and 260 (C1-C8), and the conduction units 222 and 262 that are connected to the corresponding first through eighth anode and cathode current collecting units 220 (A1-A8) and 260 (C1-C8), respectively.

FIGS. 12 and 13 also respectively illustrate anode and cathode collecting bodies 244 and 266. In various aspects, FPCBs have the current collecting bodies 244 and 266 (formed of a conductive metal) that are formed on the non-conductive supporting bodies 214 and 216. In this case, after the anode current collecting bodies 244 and the cathode current collecting bodies 266 are respectively formed on polyimide films in one (or a single) unit with the polyimide films, the polyimide films can be bonded to the electrolyte membrane 210 to form the MEA 200.

The conduction unit 222 connected to the first anode current collecting unit 220 (A1) and the conduction unit 262 connected to the eighth cathode current collecting unit 260 (C8) are respectively connected to terminals 224 and 264 to be electrically connected to external devices. The terminals 224 and 264 may be formed as extensions of the conduction unit 222 connected to the first anode current collecting unit 220 (A1) and the conduction unit 262 connected to the eighth cathode current collecting unit 260 (C8), respectively.

As shown in FIG. 13, an end 262a of the conduction unit 262 of the first cathode current collecting unit 260 (C1) in the first cell extends to the outside of the non-conductive supporting body 216. Also, as shown in FIG. 12, an end 222a of the conduction unit 222 of the second anode current collecting unit 220 (A2) in the second cell extends to the outside of the non-conductive supporting body 214. The respective ends 222a and 262a of the conduction units 222 and 262 are electrically connected to each other. To form a structure, such as the FPCBs, the non-conductive supporting body 216 (on which the first through eighth cathode current collecting units 260, the conduction units 262, and the terminal 264 are formed) is disposed between the cathode electrodes 270 and the electrolyte membrane 210. Also, the non-conductive supporting body 214 (on which the first through eighth anode current collecting units 220, the conduction units 222, and the terminal 224 are formed) is disposed between the anode electrodes 230 and the electrolyte membrane 210. Then, the non-conductive supporting body 216, the non-conductive supporting body 214, and the electrolyte membrane 210 are hot pressed at a temperature of 125° C. for 3 minutes with a compression of 3 tons per cm². In other aspects, other temperatures, times, and/or pressures are possible.

Afterwards, the respective ends 222a and 262a of the conduction units 222 and 262 are electrically connected to each other, for example, by using a spot welder or an ultrasonic welder. In this way, the second through eighth anode current collecting units (A2 through A8) in each of the cells are electrically connected to the first through seventh cathode current collecting units (C1 through C7). Accordingly, the first through eighth cells of the anode and cathode collecting bodies 244 and 266 are connected in series.

In the aspect shown, the respective first through eighth anode and cathode current collecting units 220 (A1-A8) and 260 (C1-C8), the conduction units 222 and 262, and the terminals 224 and 264 can be formed of a metal having electrical conductivity of 1 S/cm or more. The metal may be or include Ag, Au, Al, Ni, Cu, Pt, Ti, Mn, Zn, Fe, Sn, or an alloy of these metals. Instead of a metal, a conductive polymer, such as polyaniline, polypyrrole, polythiophene, or other material, can also be used.

Referring to FIG. 12, in the monopolar type MEA 200 the conduction units 222 and 262 that connect between the first through eighth anode current collecting units 220 (A1-A8) and the first through eighth cathode current collecting units 260 (C1-C8) have a very short length since the conduction units 222 and 262 are directly connected. Accordingly, the connection has a small electrical resistance. Also, since the first through eighth anode and cathode current collecting units 220 (A1-A8) and 260 (C1-C8), respectively, are installed between the electrolyte membrane 210 and the catalyst layers (not shown) of the anode and cathode electrodes 230 and 270, there is no (little or reduced) resistance when electrons generated from the catalyst layers pass through the fuel diffusion units (not shown) of the anode and cathode electrodes 230 and 270 and the electrode supporting bodies 214 and 216.

The monopolar type MEA 200 can also be structured to measure the change of operation state condition caused during the generation of electricity or electrical connection by having mounted resistance devices, such as sensing elements S, in the current collecting bodies 244 and 266. FIGS. 12 and 13 show example structures of the sensing elements S for measuring temperatures that use the resistance devices in the same manner as shown in FIG. 4 and FIG. 9, for example. That is, the sensing elements S can be structured to measure fuel concentration using a pair of resistance devices as in FIG. 5, or to measure the supply state of the fuel using four resistance devices S as in FIG. 8. Temperature and fuel concentration in the MEA 200 can be measured by installing corresponding sensing elements S to corresponding current collecting units 220 and 260 as in the previous aspect. Thus, a detailed description thereof will not be repeated.

Figure 14:
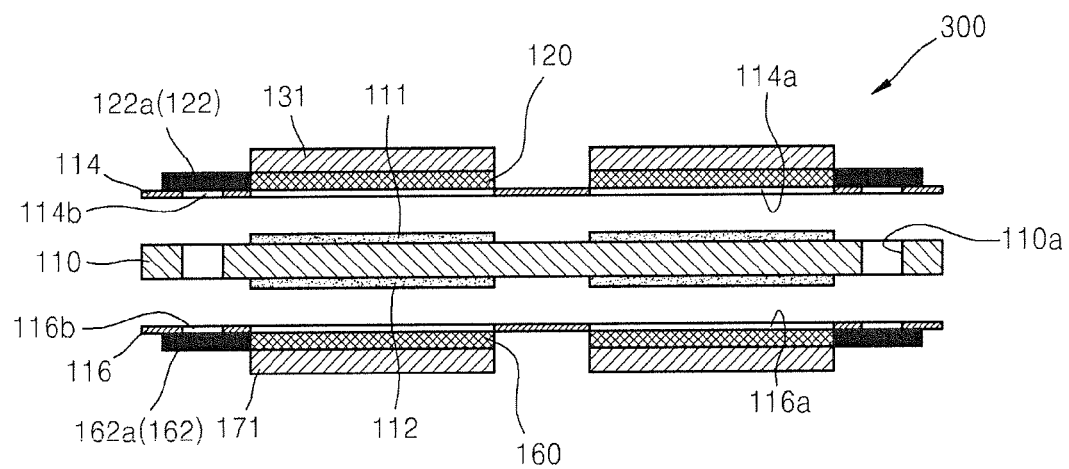
FIG. 14 is a schematic cross-sectional view illustrating a monopolar type MEA according to another aspect of the present invention.
Figure 15:
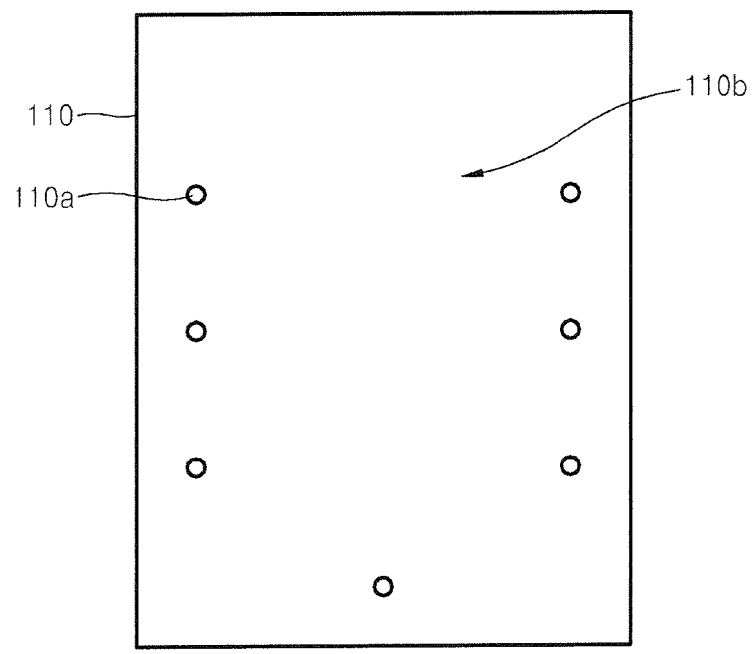
FIG. 15 is a plan view of the electrolyte membrane of the monopolar type MEA of FIG. 14, according to another aspect of the present invention.
Figure 16:
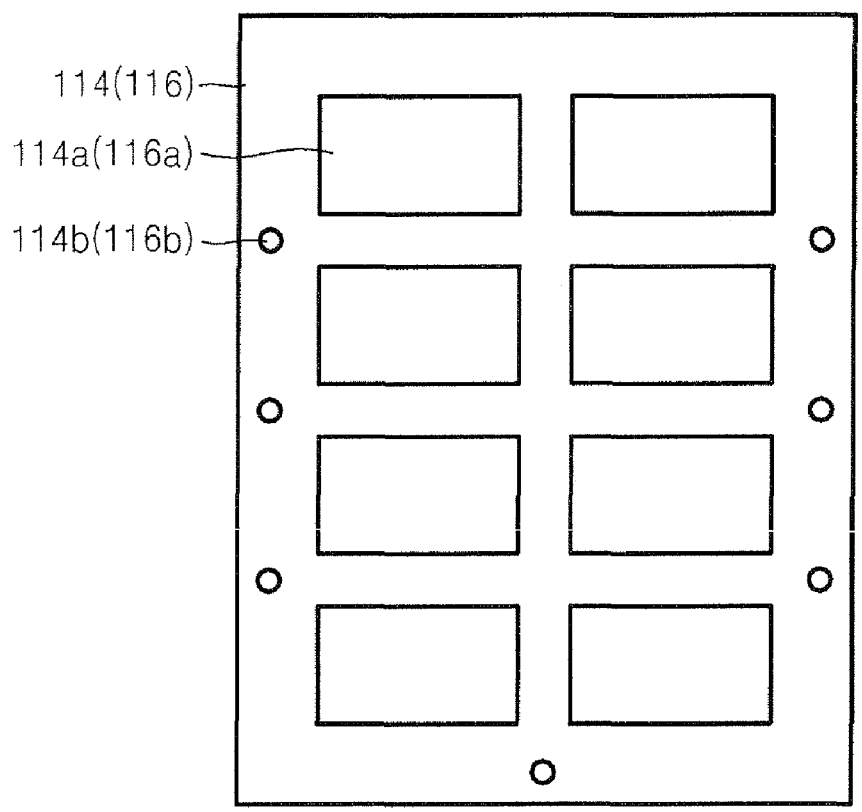
FIG. 16 is a plan view of a supporting body of the monopolar type MEA of FIG. 14, according to another aspect of the present invention.
Figure 17:
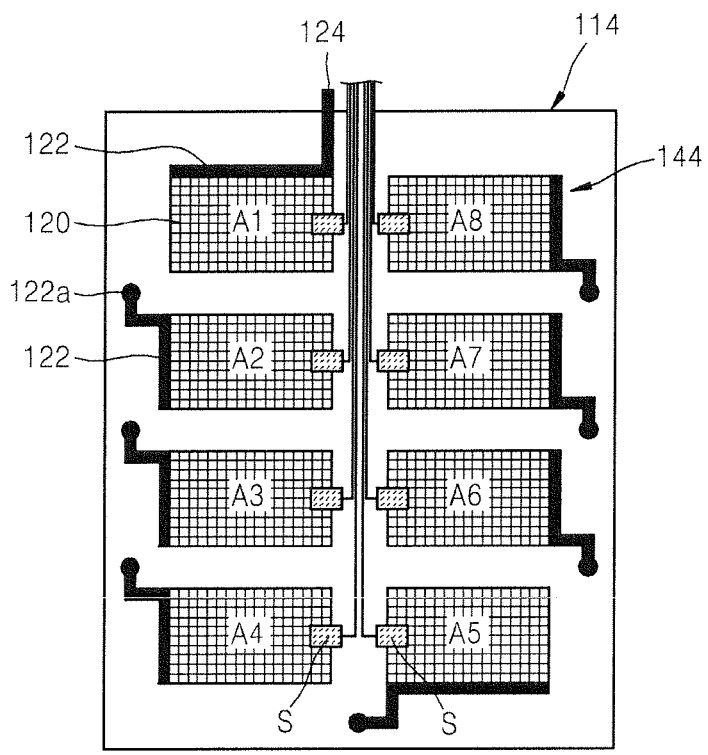
FIGS. 17 and 18 are plan views respectively illustrating anode and cathode current collecting bodies that can be inserted into the monopolar type MEA of FIG. 14, according to another aspect of the present invention.
Figure 18:
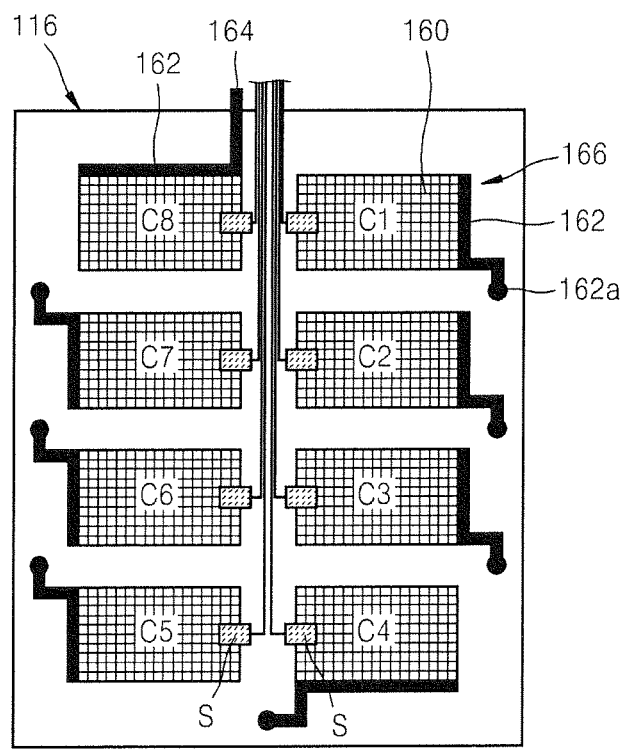

FIG. 14 is a schematic cross-sectional view illustrating a monopolar type MEA 300 according to another aspect of the present invention. FIG. 15 is a plan view of an electrolyte membrane of the monopolar type MEA 300 of FIG. 14, according to an aspect of the present invention, and FIG. 16 is a plan view of a supporting body of the monopolar type MEA 300 of FIG. 14, according to an aspect of the present invention. FIGS. 17 and 18 are plan views respectively illustrating current collecting bodies 144 and 166 which can be inserted into the monopolar type MEA 300 of FIG. 14, according to another aspect of the present invention. The monopolar type MEA 300 has some of the same basic structure as the monopolar type MEA 100 in FIG. 1. Thus, like reference numerals are used to indicate elements that are substantially identical to the elements of FIG. 1.

Referring to FIGS. 14 through 18, the monopolar type MEA 300 (into which the current collecting bodies illustrated in FIGS. 17 and 18 are inserted) includes an electrolyte membrane 110 on which a plurality of cell regions 110b, for example, for eight cells (first through eighth cells) are formed. A plurality of catalyst layers 111 and 112 respectively corresponding to the cell regions are formed on both surfaces of the electrolyte membrane 110, respectively. Non-conductive supporting bodies 114 and 116 (in which a plurality of first openings 114a and 116a are respectively formed) are installed on the catalyst layers 111 and 112. The non-conductive supporting bodies 114 and 116 may be polyimide films. The non-conductive supporting bodies 114 and 116 can also be formed of polyethylene, polypropylene, polyvinyl chloride, or other materials.

As shown, each of the non-conductive supporting bodies 114 and 116 further include second openings 114b and 116b, respectively, corresponding to the second to seventh cell regions (FIGS. 17 and 18) and the first (FIG. 18) or eighth (FIG. 17) cell region. The electrolyte membrane 110 can further include openings 110a corresponding to the second openings 114b and 116b of the respective non-conductive supporting bodies 114 and 116.

First through eighth anode current collecting units 120 (A1 through A8) and first through eighth cathode current collecting units 160 (C1 through C8) are formed in the respective cell regions of the respective non-conductive supporting bodies 114 and 116. Anode diffusion units 131 and cathode diffusion units 171 are respectively installed on the anode current collecting units 120 and the cathode current collecting units 160.

The first through eighth anode current collecting units 120 (A1 through A8) and the first through eighth cathode current collecting units 160 (C1 through C8) can be metal meshes having a lattice shape, though other shapes and materials can be used. A conduction unit 122 is formed on a side of each of the first through eighth anode current collecting units 120 (A1-A8), and a conduction unit 162 is formed on a side of each of the first through eighth cathode current collecting units 160 (C1-C8). Each of the anode and cathode current collecting bodies 144 and 166 include the first through eighth anode and cathode current collecting units 120 (A1-A8) and 160 (C1-C8) and the conduction units 122 and 162 that are connected to the corresponding first through eighth anode and cathode current collecting units 120 (A1-A8) and 160 (C1-C8).

The first through eighth anode current collecting units 120 (A1-A8) are disposed on paths along which a liquid fuel is supplied to the catalyst layers 111 through the anode diffusion units 131. The first through eighth anode current collecting units 120 (A1-A8) can be formed in a mesh shape or a stripe shape having an opening ratio of 20 to 70%, for example. The amount of fuel supplied to the catalyst layers 111 can be controlled to some extent by controlling the opening ratio of the anode current collecting units 120, such as by using a controller using the sensors S. In various aspects, other opening ratios are within the scope of the invention.

The first through eighth cathode current collecting units 160 (C1-C8) are disposed on a path along which oxygen (or air) is supplied to the catalyst layers 112 through the cathode diffusion units 171. The first through eighth cathode current collecting units 160 (C1-C8) can be formed in a mesh shape or a stripe shape having an opening ratio of 20 to 70%, for example. The leakage of water generated from the catalyst layers 112 to the outside can be controlled by controlling the opening ratio of the cathode current collecting units 160, such as by using a controller using the sensors S. In various aspects, other opening ratios are within the scope of the invention.

FIGS. 17 and 18 also respectively illustrate anode and cathode current collecting bodies 144 and 166. The flexible printed circuit boards (FPCBs) have current collecting bodies formed of a conductive metal that are formed on the non-conductive supporting bodies 114 and 116, such as polyimide films. In this case, after the anode current collecting bodies 144 and the cathode current collecting bodies 166 are respectively formed on the polyimide films in one (or a single) unit with the polyimide films, the polyimide films can be bonded to the electrolyte membrane 110 to form the MEA 300.

The conduction unit 122 connected to the first anode current collecting unit 120 (A1) and the conduction unit 162 connected to the eighth cathode current collecting unit 160 (C8) are respectively connected to terminals 124 and 164 to be electrically connected to an external device. The terminals 124 and 164 may be formed as extensions of the conduction unit 122 connected to the first anode current collecting unit 120 (A1) and the conduction unit 162 connected to the eighth cathode current collecting unit 160 (C8), respectively.

As shown in FIG. 18, an end 162a of the conduction unit 162 of the first cathode current collecting unit 160 (C1) in the first cell is located on the second opening 116b formed in the non-conductive supporting body 116. Also, as shown in FIG. 17, an end 122a of the conduction unit 122 of the second anode current collecting unit 120 (A2) in the second cell is located on the second opening 114b formed in the non-conductive supporting body 114. The respective ends 122a and 162a of the conduction units 122 and 162 are electrically connected through the second openings 114b and 116b and the openings 110a of the electrolyte membrane 110. To form a structure, such as the FPCBs, the non-conductive supporting body 116 (on which the first through eighth cathode current collecting units 160, the conduction units 162, and the terminal 164 are formed) is disposed between the cathode diffusion units 171 and the electrolyte membrane 110. Also, the non-conductive supporting body 114 (on which the first through eighth anode current collecting units 120, the conduction units 122, and the terminal 124 are formed) is disposed between the anode diffusion units 131 and the electrolyte membrane 110. Then, the non-conductive supporting body 116, the non-conductive supporting body 114, and electrolyte membrane 110 are hot pressed at a temperature of 125° C. for 3 minutes with a compression of 3 tons per cm$^2$ while the openings 114b and 116b formed in the non-conductive supporting bodies 114 and 116 are aligned. In other aspects, other temperatures, times, and/or pressures are possible.

Afterwards, the ends 122a and 162a of the conduction units 122 and 162 are electrically bonded (or welded) through the second openings 114b and 116b, and the openings 110a, for example, by using a spot welder or an ultrasonic welder. In this way, the second through eighth anode current collecting units 120 (A2 through A8) in each of the cells are electrically connected to the respective first through seventh cathode current collecting units 160 (C1 through C7) in the adjacent cell through the openings 114b and 116b and the openings 110a. Accordingly, the first through eighth cells of the anode and cathode current collecting bodies 144 and 166 are connected in series.

In the aspect shown, the first through eighth anode and cathode current collecting units 120 (A1-A8) and 160 (C1-C8), the conduction units 122 and 162, and the terminals 124 and 164 can be formed of a metal having electrical conductivity of 1 S/cm or more. The metal may be or include Ag, Au, Al, Ni, Cu, Pt, Ti, Mn, Zn, Fe, Sn, or an alloy of these metals. Instead of a metal, a conductive polymer such as polyaniline, polypyrrole, polythiophene, or other materials can also be used.

In other aspects, the electrolyte membrane 110 may not have the openings 110a. In this aspect, the width of the electrolyte membrane 110 is limited to (or narrower than the) inner sides of the second openings 114b and 116b.

A fuel cell can be manufactured when a hydrogen supply unit (not shown) and an oxygen (or air) supply unit (not shown) are respectively formed on side surfaces of the monopolar type MEA 300. The method of manufacturing such a fuel cell is well known in the art. Thus, a detailed description thereof will be omitted.

In this aspect, the monopolar type MEA 300 can also be structured to (or include elements to) measure changes of operation state conditions caused during the generation of electricity or electrical connection by way of mounting sensing elements (such as resistance devices S) in the current collecting bodies 144 and 166. FIGS. 17 and 18 show example structures of the sensing elements S for measuring temperatures that use the resistance devices S in the same manner as in FIG. 4. That is, the sensing elements S can be structured to measure fuel concentration using a pair of resistance devices as in FIG. 5, or to measure the supply state of the fuel using four resistance devices S as in FIG. 8. Temperature and fuel concentration in the MEA 300 can be measured by installing corresponding sensing elements S to corresponding current collecting units 120 and 160 as in the previous aspect. The sensors S can be connected to a controller so as to make the appropriate adjustment in other aspects. Thus, a detailed description thereof will not be repeated.

Figure 19:
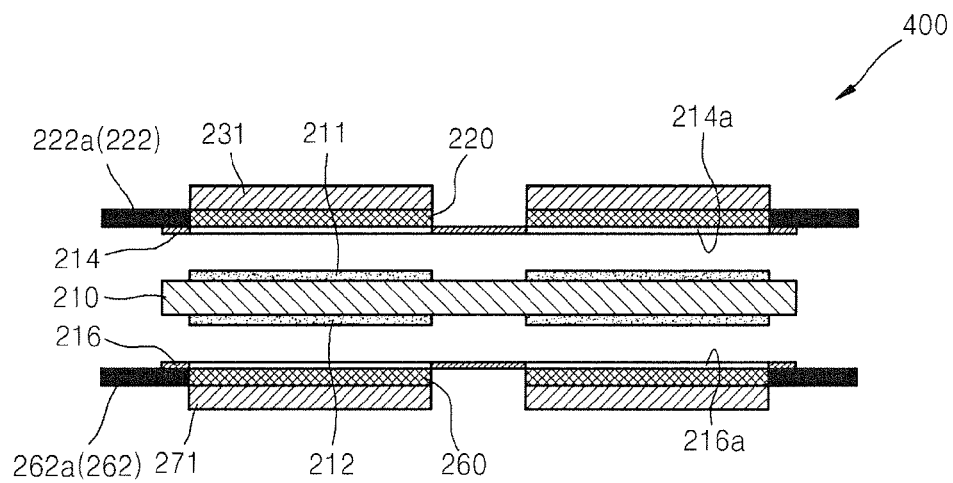
FIG. 19 is a schematic cross-sectional view illustrating a monopolar type MEA according to another aspect of the present invention.
Figure 20:
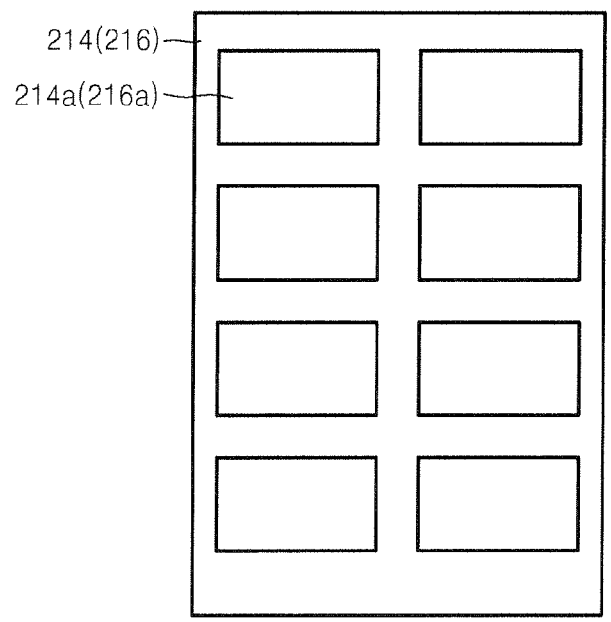
FIG. 20 is a plan view of a supporting body of the monopolar type MEA of FIG. 19, according to another aspect of the present invention.
Figure 21:
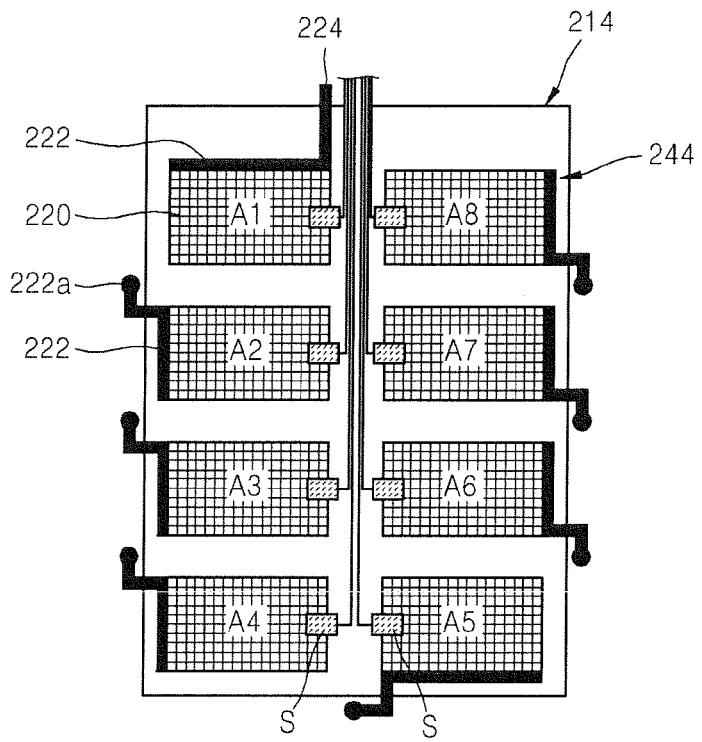
FIGS. 21 and 22 are plan views respectively illustrating anode and cathode current collecting bodies that can be inserted into the monopolar type MEA of FIG. 19, according to another aspect of the present invention.
Figure 22:
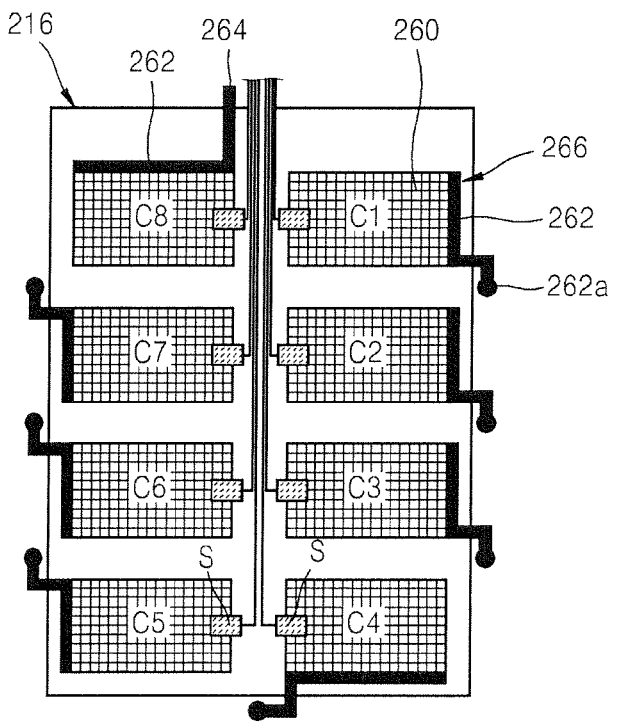

FIG. 19 is a schematic cross-sectional view illustrating a monopolar type MEA 400 according to another aspect of the present invention. FIG. 20 is a plan view of a supporting body of the monopolar type MEA 400 of FIG. 19, according to an aspect of the present invention, and FIGS. 21 and 22 are plan views illustrating anode and cathode current collecting bodies 244, 266 that can be inserted into the monopolar type MEA 400 of FIG. 19, according to another aspect of the present invention. The monopolar type MEA 400 has some of the same basic structures as the monopolar type MEA 200 in FIG. 10. Thus, like reference numerals are used to indicate elements that are substantially identical to the elements of FIG. 10.

Referring to FIGS. 19 through 22, the monopolar type MEA 400 (into which the anode and cathode current collecting bodies of FIGS. 21 and 22 are inserted) includes an electrolyte membrane 210 on which a plurality of cell regions 210*b*, for example, for eight cells (first through eighth cells) are formed. A plurality of catalyst layers 211 and 212 respectively corresponding to the cell regions are formed on both surfaces of the electrolyte membrane 210. Non-conductive supporting bodies 214 and 216 (for example, polyimide films) in which a plurality of first openings 214*a* and 216*a* are formed, are installed on the catalyst layers 211 and 212. The non-conductive supporting bodies 214 and 216 can also be formed of polyethylene, polypropylene, polyvinyl chloride, or other materials.

First through eighth anode current collecting units 220 (A1 through A8) and first through eighth cathode current collecting units 260 (C1 through C8) are formed in respective cell regions in the non-conductive supporting bodies 214 and 216, respectively. Anode diffusion units 231 and cathode diffusion units 271 are respectively installed on the first through eighth anode current collecting units 220 and the first through eighth cathode current collecting units 260.

The first through eighth anode current collecting units 220 (A1 through A8) and the first through eighth cathode current collecting units 260 (C1 through C8) can be metal meshes having a lattice shape. A conduction unit 222 is formed on a side of each of the first through eighth anode current collecting units 220 (A1-A8), and an end 222*a* of each of the conduction units 222 extend to outside of the non-conductive supporting body 214. A conduction unit 262 is formed on a side of each of the first through eighth cathode current collecting units 260 (C1-C8), and end 262*a* of each of the conduction units 262 extends to outside of the non-conductive supporting body 216. Each of the anode and cathode current collecting bodies 244 and 266 includes the first through eighth anode and cathode current collecting units 220 (A1-A8) and 260 (C1-C8), and the conduction units 222 and 262 that are connected to the corresponding anode and cathode current collecting units 220 (A1-A8) and 260 (C1-C8).

The first through eighth anode current collecting units 220 (A1-A8) are disposed on paths along which a liquid fuel is supplied to the catalyst layers 211 through the anode diffusion units 231. The first through eighth anode current collecting units 220 (A1-A8) can be formed in a mesh shape or a stripe shape having an opening ratio of 20 to 70%, for example. The amount of fuel supplied to the catalyst layers 211 can be controlled to some extent by controlling the opening ratio of the first through eighth anode current collecting units 220. In various aspects, other opening ratios are within the scope of the invention.

The first through eighth cathode current collecting units 260 (C1-C8) are disposed on paths along which oxygen (or air) is supplied to the catalyst layers 212 through the cathode diffusion units 271. The first through eighth cathode current collecting units 260 (C1-C8) can be formed in a mesh shape or a stripe shape having an opening ratio of 20 to 70%, for example. The leakage of water generated from the catalyst layers 212 to the outside can be controlled by controlling the opening ratio of the first through eighth cathode current collecting units 260. In various aspects, other opening ratios are within the scope of the invention.

FIGS. 21 and 22 also respectively illustrate anode and cathode current collecting bodies 244 and 266. The FPCBs have current collecting bodies 244 and 266 (formed of a conductive metal) that are formed on non-conductive supporting bodies 214 and 216, such as polyimide films. In this case, after the anode current collecting bodies 244 and the cathode current collecting bodies 266 are respectively formed on the polyimide films in one (or as a single) unit with the polyimide films, the polyimide films can be bonded to the electrolyte membrane 210 to form the MEA 400.

The conduction unit 222 connected to the first anode current collecting unit 220 (A1) and the conduction unit 262 connected to the eighth cathode current collecting unit 260 (C8) are respectively connected to terminals 224 and 264 to be electrically connected to an external device. The terminals 224 and 264 may be formed as extensions of the conduction unit 222 connected to the first anode current collecting unit 220 (A1) and the conduction unit 262 connected to the eighth cathode current collecting unit 260 (C8).

As shown in FIG. 22, an end 262*a* of the conduction unit 262 of the first cathode current collecting unit 260 (C1) in the first cell is extended to the outside of the non-conductive supporting body 216, and an end 222*a* of the conduction unit 222 of the second anode current collecting unit 220 (A2) in the second cell is extended to the outside of the non-conductive supporting body 214. The ends 222*a* and 262*a* of the conduction units 222 and 262 are electrically connected. To form a structure, such as the FPCB, the non-conductive supporting body 216 (on which the first through eighth cathode current collecting units 260, the conduction units 262, and the terminal 264 are formed) is disposed between the cathode electrodes 270 and the electrolyte membrane 210. Also, the non-conductive supporting body 214 (on which the first through eighth anode current collecting units 220, the conduction units 222, and the terminal 224 are formed) is disposed between the anode electrodes 230 and the electrolyte membrane 210. Then, the non-conductive supporting body 216, the non-conductive supporting body 214, and the electrolyte membrane 210 are hot pressed at a temperature of 125° C. for 3 minutes with a compression of 3 tons per cm$^2$. In other aspects, other temperatures, times, and/or pressures are possible.

Afterwards, the respective ends 222*a* and 262*a* of the conduction units 222 and 262 are electrically bonded (or connected) using a spot welder or an ultrasonic welder, for example. In this way, the second through eighth anode current collecting units 220 (A2 through A8) in each of the cells are electrically connected to the first through seventh cathode current collecting units 260 (C1 through C7) in the adjacent cell. Accordingly, the first through eighth cells of the anode and cathode current collecting bodies 244 and 266 are connected in series.

In the aspect shown, the first through eighth anode and cathode current collecting units 220 (A1-A8) and 260 (C1-C8), the conduction units 222 and 262, and the terminals 224 and 264, can be formed of a metal having electrical conductivity of 1 S/cm or more. The metal may be, or include Ag, Au, Al, Ni, Cu, Pt, Ti, Mn, Zn, Fe, Sn, or an alloy of these metals. Instead of a metal, a conductive polymer, such as polyaniline, polypyrrole, polythiophene, or other materials can also be used.

In the monopolar type MEA 400, the conduction units 222 and 262 that connect between the first through eighth anode current collecting units 220 (A1-A8) and the first through eighth cathode current collecting units 260 (C1-C8) have a very short length since the conduction units 222 and 262 are directly connected. Accordingly, the connection has a small electrical resistance. Also, since the first through eighth anode and cathode current collecting units 220 (A1-A8) and 260 (C1-C8) are installed between the electrolyte membrane 210 and the catalyst layers 211 and 212, there is no (small or reduced) resistance when the electrons generated from the catalyst layers 211 and 212 pass through the fuel diffusion units 231 and 271 of the anode and cathode electrodes 230 and 270 and the electrode supporting bodies 214 and 216.

The monopolar type MEA 400 can also be structured to measure the changes of operation state conditions caused during the generation of electricity or electrical connection having mounted sensing elements (such as resistance devices) in the current collecting bodies 244 and 266. FIGS. 21 and 22 show example structures of the sensing elements S for measuring temperatures that use the resistance devices in the same manner as in FIG. 4. That is, the sensing elements S can be structured to measure fuel concentration using a pair of resistance devices as in FIG. 5, or to measure the supply state of the fuel using four resistance devices as in FIG. 8. Temperature and fuel concentration in the MEA 400 can be measured by a controller connected to the sensors S by installing corresponding sensing elements S to corresponding current collecting units 220 and 260 as in the previous aspect. Thus, a detailed description thereof will not be repeated.

It is understood that in various aspects, any number of sensing elements are within scope of the present invention. In various aspects, use of and/or refers to one, all, or any combinations.

A monopolar type MEA according to aspects of the present invention, which is a main structure of a fuel cell, provides the following and/or other advantages. Since the operation state conditions in the monopolar type MEA (such as temperature change or fuel concentration change) can be detected on a real time basis, optimum operating conditions can be obtained. Also, since the operation state conditions of the monopolar type MEA can be monitored on a real-time basis, appropriate action can be immediately taken whenever an abnormal operation is detected, to thereby increase the lifetime of the fuel cell.

Although a few aspects of the present invention have been shown and described, it would be appreciated by those skilled in the art that changes may be made in the aspects without departing from the principles and spirit, the scope of which is defined in the claims and their equivalents.

What is claimed is:

1. A monopolar membrane electrode assembly (MEA) comprising:
    an electrolyte membrane having a plurality of cell regions;
    an anode supporting body and a cathode supporting body respectively formed on opposite surfaces of the electrolyte membrane, and each having a plurality of first openings corresponding to each of the cell regions and a plurality of second openings peripheral to respective cell regions;
    a plurality of anode current collecting bodies and a plurality of cathode current collecting bodies that are respectively installed in each of the cell regions on the anode and cathode supporting bodies, and comprising current collecting units to collect current from the cell regions and conduction units formed on a side of the current collecting units;
    a plurality of anode electrodes and cathode electrodes respectively installed on the anode current collecting bodies and the cathode current collecting bodies, the plurality of anode current collecting bodies, the plurality of cathode current collecting bodies, the plurality of anode electrodes, the plurality of cathode electrodes, and the electrolyte membrane forming a plurality of unit cells, each unit cell corresponding to one of the cell regions; and
    a plurality of sensing elements, each sensing element detecting a change in an operation state condition in a respective one of the plurality of unit cells in the monopolar MEA during electricity generation or electrical connection, and each sensing element being mounted in an anode current collecting body or a cathode current collecting body of the respective one of the unit cells and contacting the electrolyte membrane, and each sensing element being individually connected to an external device through a respective wire disposed on the anode supporting body or cathode supporting body,
    wherein:
        the electrolyte membrane includes electrolyte membrane holes corresponding to the second openings of the anode supporting body and cathode supporting body, and
        ends of the conduction units of the cathode current collecting bodies are electrically connected in series to ends of the conduction units of adjacent anode current collecting bodies through the electrolyte membrane holes and the second openings.

2. The monopolar MEA of claim 1, wherein the plurality of sensing elements comprises resistance devices that contact the electrolyte membrane to measure temperature changes in respective ones of the plurality of unit cells of the monopolar MEA due to a resistance variation in respective ones of the sensing elements.

3. The monopolar MEA of claim 1, wherein the plurality of sensing elements comprises pairs of sensing elements, each pair of sensing elements contacting the electrolyte membrane at respective cell regions to measure fuel concentration changes of a fuel wetted on the electrolyte membrane at the respective cell region from a change in the resistance between the paired sensing elements at the respective cell region.

4. The monopolar MEA of claim 1, further including a plurality of reference electrodes separated from the anode electrodes and cathode electrodes, and wherein the plurality of sensing elements comprises devices to measure a generation voltage of the anode and cathode electrodes in respective ones of the plurality of unit cells and devices that are connected to the reference electrodes to measure an open circuit voltage (OCV) in respective ones of the plurality of unit cells.

5. The monopolar MEA of claim 1, wherein the conduction units of the current collecting bodies comprise on/off switches so that the current collecting bodies are selectively connected.

6. The monopolar MEA of claim 1, wherein the anode and cathode supporting bodies are formed of polyimide, polyethylene, polypropylene, and/or polyvinyl chloride.

7. The monopolar MEA of claim 1, wherein each of the anode and cathode supporting bodies and the anode and cathode current collecting bodies are respectively formed as a single unit in a flexible printed circuit board (FPCB).

8. The monopolar MEA of claim 1, wherein the anode and cathode current collecting bodies include Ag, Au, Al, Ni, Cu, Pt, Ti, Mn, Zn, Fe, Sn, and/or alloys of these metals.

9. A monopolar membrane electrode assembly (MEA) comprising:
an electrolyte membrane having a plurality of cell regions;
catalyst layers formed corresponding to each of the cell regions on opposite surfaces of the electrolyte membrane, respectively;
an anode supporting body and a cathode supporting body respectively formed on the opposite surfaces of the electrolyte membrane, and having a plurality of first openings corresponding to the each of the cell regions and a plurality of second openings peripheral to respective cell regions;
a plurality of anode current collecting bodies and a plurality of cathode current collecting bodies that are respectively installed in each of the cell regions on the anode and cathode supporting bodies, and comprising current collecting units to collect current from the cell regions and conduction units formed on a side of the current collecting units;
a plurality of anode diffusion units and cathode diffusion units respectively installed on the anode current collecting bodies and the cathode current collecting bodies, the plurality of anode current collecting bodies, the plurality of cathode current collecting bodies, the plurality of anode electrodes, the plurality of cathode electrodes, and the electrolyte membrane forming a plurality of unit cells, each unit cell corresponding to one of the cell regions; and
a plurality of sensing elements, each sensing element detecting a change in an operation state condition in a respective one of the plurality of unit cells in the monopolar MEA during electricity generation or electrical connection, and each sensing element being mounted in an anode current collecting body or a cathode current collecting body of the respective one of the unit cells and contacting the electrolyte membrane, and each sensing element being individually connected to an external device through a respective wire disposed on the anode supporting body or cathode supporting body,
wherein:
the electrolyte membrane includes electrolyte membrane holes corresponding to the second openings of the anode supporting body and cathode supporting body, and
ends of the conduction units of the cathode current collecting bodies are electrically connected in series to ends of the conduction units of the anode current collecting bodies through the electrolyte membrane holes and the respective second openings.

10. The monopolar MEA of claim 9, wherein the plurality of sensing elements comprises resistance devices that contact the electrolyte membrane to measure temperature changes in respective ones of the plurality of unit cells of the monopolar MEA due to a resistance variation in respective ones of the sensing elements.

11. The monopolar MEA of claim 9, wherein the plurality of sensing elements comprises pairs of the sensing elements, each pair of sensing elements contacting the electrolyte membrane at one of the respective cell regions to measure the fuel concentration changes of a fuel wetted on the electrolyte membrane at the respective cell region from a change in the resistance between the paired sensing elements at the respective cell region.

12. The monopolar MEA of claim 9, further including a plurality of reference electrodes separated from the anode electrodes and cathode electrodes, and, wherein the plurality of sensing elements comprises devices to measure a generation voltage of the anode and cathode electrodes in respective ones of the plurality of unit cells and devices that are connected to the reference electrodes to measure an open circuit voltage (OCV) in respective ones of the plurality of unit cells.

13. The monopolar MEA of claim 9, wherein the conduction units of the anode and cathode current collecting bodies comprise on/off switches so that the current collecting bodies are selectively connected.

14. The monopolar MEA of claim 9, wherein the anode and cathode supporting bodies are formed of polyimide, polyethylene, polypropylene, and/or polyvinyl chloride.

15. The monopolar MEA of claim 9, wherein each of the anode and cathode supporting bodies and the anode and cathode current collecting bodies are integrally formed in a single unit as a flexible printed circuit board (FPCB).

16. The monopolar MEA of claim 9, wherein the anode and cathode current collecting bodies are formed of Ag, Au, Al, Ni, Cu, Pt, Ti, Mn, Zn, Fe, Sn, and/or alloys of these metals.

* * * * *